May 15, 1951

G. E. DATH 2,552,667

COMBINED RUBBER AND FRICTION SHOCK ABSORBING
MEANS FOR RAILWAY CAR TRUCKS

Filed July 16, 1949

2 Sheets-Sheet 1

Inventor:
George E. Dath.
By
Henry Fuchs.
Atty.

May 15, 1951 G. E. DATH 2,552,667
COMBINED RUBBER AND FRICTION SHOCK ABSORBING
MEANS FOR RAILWAY CAR TRUCKS
Filed July 16, 1949 2 Sheets-Sheet 2

Inventor:
George E. Dath.
By Henry Fuchs.

Patented May 15, 1951

2,552,667

UNITED STATES PATENT OFFICE 2,552,667

COMBINED RUBBER AND FRICTION SHOCK ABSORBING MEANS FOR RAILWAY CAR TRUCKS

George E. Dath, Mokena, Ill., assignor to W. H. Miner, Inc., Chicago, Ill., a corporation of Delaware Application July 16, 1949, Serial No. 105,196

7 Claims. (Cl. 267—9)

This invention relates to improvements in combined rubber and friction shock absorbing means adapted for use in connection with trucks of railway cars.

One object of the invention is to provide a shock absorber of the character indicated, comprising a lengthwise compressible rubber block having friction means in the form of relatively sliding friction plates associated therewith, wherein the friction plates are mounted within the rubber block in face to face sliding contact with each other.

A more specific object of the invention is to provide a shock absorber as set forth in the preceding paragraph, wherein the friction plates are molded in the rubber block and positioned so that they are pressed against each other and moved lengthwise with respect to each other during lengthwise compression of the block.

Other objects of the invention will more clearly appear from the description and claims hereinafter following.

Figure 1:
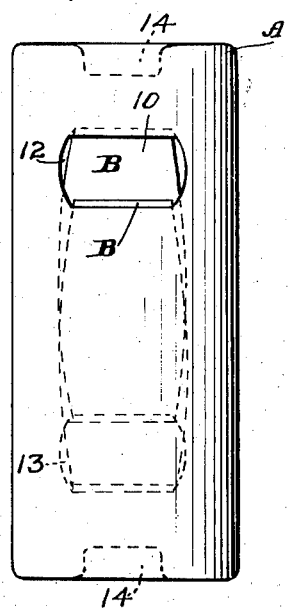
Figure 2:
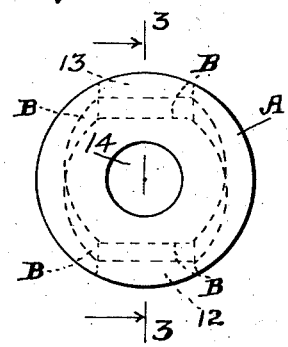
Figure 4:
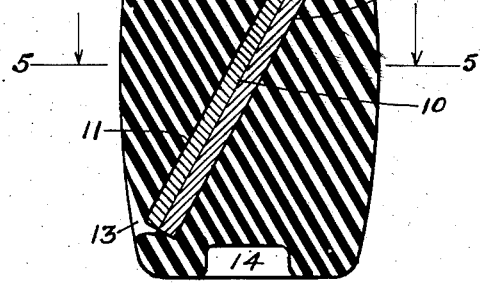
Figure 3:
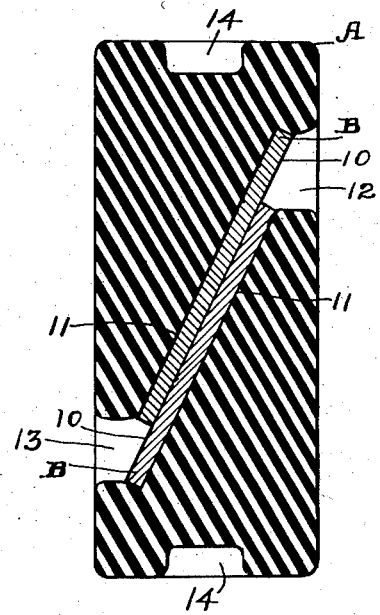
Figure 5:
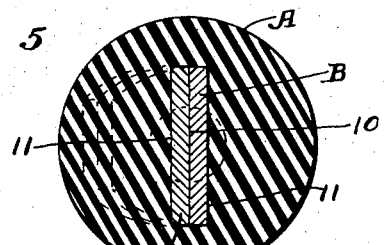
Figure 6:
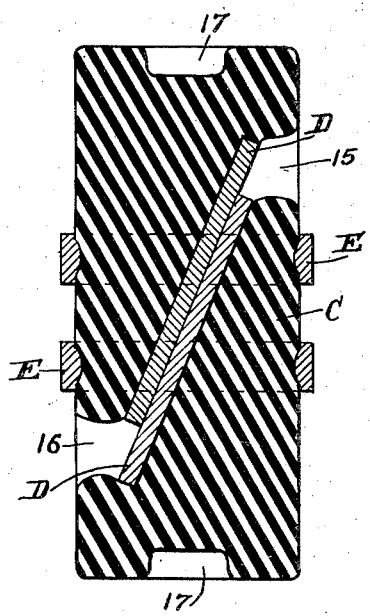
Figure 7:
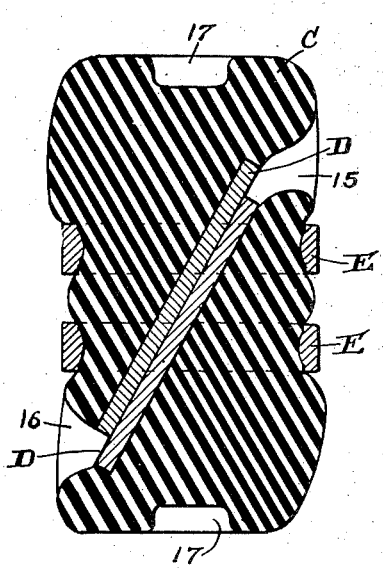
Figure 8:
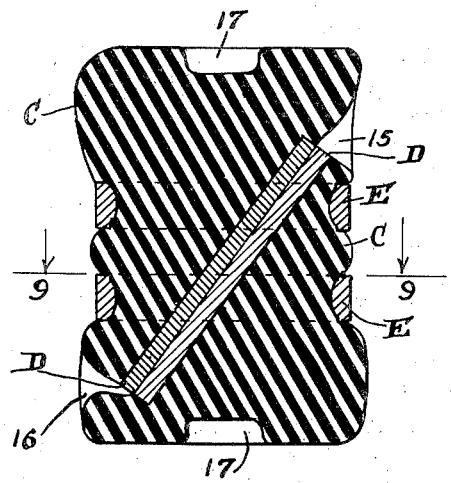
Figure 9:
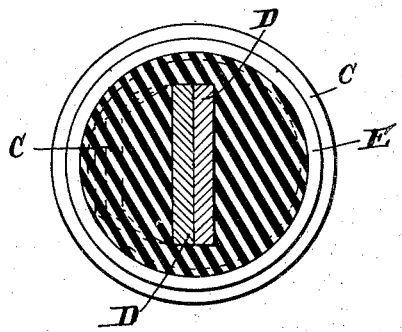

In the accompanying drawings forming a part of this specification, Figure 1 is a side elevational view of my improved combined rubber and friction shock absorber. Figure 2 is a top plan view of Figure 1. Figure 3 is a transverse, vertical sectional view, corresponding substantially to the line 3—3 of Figure 2. Figure 4 is a view similar to Figure 3, showing the mechanism fully compressed. Figure 5 is a horizontal sectional view, corresponding substantially to the line 5—5 of Figure 4. Figure 6 is a view similar to Figure 3, illustrating another embodiment of the invention. Figure 7 is a view similar to Figure 6, showing the mechanism partly compressed. Figure 8 is a view similar to Figure 6, showing the mechanism fully compressed. Figure 9 is a horizontal sectional view, corresponding substantially to the line 9—9 of Figure 8.

Referring first to the embodiment of the invention illustrated in Figures 1 to 5 inclusive, my improved shock absorber comprises broadly a rubber block A and a pair of friction plates B—B molded within the block A.

The rubber block A is in the form of an elongated cylinder, having the friction plates B—B molded therein. The friction plates B—B are of similar design, each plate being of elongated, rectangular shape and having a lengthwise extending friction surface 10 on its inner side. As shown most clearly in Figure 3, the plates B—B are preferably disposed in inclined position within the block A, with their friction surfaces 10—10 in contact with each other, and the outer sides of the same vulcanized to the rubber of said block, as indicated at 11—11. The two plates B—B are staggered with respect to each other, that is, the left hand plate B, as seen in Figure 3, normally extends upwardly beyond the upper end of the right hand plate B, and the latter extends downwardly beyond the lower end of the left hand plate. The block A has its opposite sides recessed, as indicated at 12 and 13, at the upper and lower ends, respectively, of the plates B—B to provide clearance for relative movement of these plates.

The top and bottom ends of the rubber block A are preferably provided with central seats 14—14 adapted to accommodate the usual spring centering projections of the top and bottom spring follower plates of a cluster of truck springs of a railway car.

The improved shock absorber preferably replaces the usual spring units of a railway car truck, however, the same may also be used as snubbing means for dampening the action of the usual truck springs of a railway car, and when so used, is substituted for one or more of the spring units of the truck spring cluster.

The operation of the improved shock absorber shown in Figures 1 to 5 inclusive is as follows: Upon relative movement of the spring follower plates of the truck of a railway car toward each other, the rubber block A is compressed lengthwise between said followers and the friction plates B—B are slid lengthwise with respect to each other, the parts assuming the positions shown in Figure 4 when the shock absorber has been fully compressed. Relative approach of the spring plates of the car truck is thus cushioned by the rubber block and frictionally resisted by the plates B—B, which are pressed against each other into tight frictional engagement during lengthwise compression of the block A. When the actuating force is reduced, the rubber block returns to its normal shape, as shown in Figures 1 and 2, and effects restoration of the plates B—B to their normal positions.

Referring next to the embodiment of the invention illustrated in Figures 6, 7, 8, and 9, the construction and design is similar to that shown in Figures 1 to 5 inclusive, with the exception that the rubber block is embraced by metal bands, which restrict radial expansion of the block at certain zones, thereby increasing the cushioning capacity of the rubber block.

As illustrated in Figures 6, 7, 8, and 9, my improved shock absorber comprises a rubber block C, a pair of friction plates D—D, and a pair of metal bands or rings E—E.

The rubber block C is identical with the rubber block A hereinbefore described, and the plates D—D are also identical with the plates B—B. The block C has recesses 15 and 16 in opposite sides thereof, corresponding to the recesses 12 and 13 of the block A, and seats 17—17 in the top and bottom ends, adapted to accommodate the spring centering projections of the top and bottom spring plates of a railway car truck.

The bands or rings E—E surround the block C and are vertically spaced apart, as shown in Figure 6. These bands fit the block tightly so that expansion of the same is restricted at the zones where the bands or rings are located and the material of the block is forced out between the bands or rings and above and below the same, as shown in Figures 7 and 8.

I claim:

1. In a shock absorber, the combination with an elongated rubber block adapted to be compressed lengthwise; of a pair of friction plates in sliding engagement with each other, molded in said block, said plates extending lengthwise of said block and being staggered in lengthwise direction with respect to each other.

2. In a shock absorber, the combination with an elongated rubber block adapted to be compressed lengthwise; of a pair of friction plates in sliding engagement with each other, molded in said block, said plates extending lengthwise of said block and being inclined with respect to the longitudinal axis of said block.

3. In a shock absorber, the combination with an elongated rubber block adapted to be compressed lengthwise; of a pair of friction plates in sliding engagement with each other, molded in said block, said plates extending lengthwise of said block in staggered relation and being inclined with respect to the longitudinal axis of said block.

4. In a shock absorber, the combination with an elongated rubber block adapted to be compressed lengthwise, said block being surrounded by vertically spaced bands tightly fitting said block; of a pair of friction plates in sliding engagement with each other, molded in said block, said plates extending lengthwise of said block.

5. In a shock absorber, the combination with an elongated rubber block adapted to be compressed lengthwise, said block being surrounded by vertically spaced bands tightly fitting said block; of a pair of friction plates in sliding engagement with each other, molded in said block, said plates extending lengthwise of said block and being staggered in lengthwise direction with respect to each other.

6. In a shock absorber, the combination with an elongated rubber block adapted to be compressed lengthwise, said block being surrounded by vertically spaced bands tightly fitting said block; of a pair of friction plates in sliding engagement with each other, molded in said block, said plates extending lengthwise of said block and being inclined with respect to the longitudinal axis of said block.

7. In a shock absorber, the combination with an elongated rubber block adapted to be compressed lengthwise, said block being surrounded by vertically spaced bands tightly fitting said block; of a pair of friction plates in sliding engagement with each other, molded in said block, said plates extending lengthwise of said block in staggered relation and being inclined with respect to the longitudinal axis of said block.

GEORGE E. DATH.

REFERENCES CITED

The following references are of record in the file of this patent:

UNITED STATES PATENTS

| Number | Name | Date |
| --- | --- | --- |
| 1,940,686 | Lord | Dec. 26, 1933 |
| 2,263,599 | Tucker | Nov. 25, 1941 |

FOREIGN PATENTS

| Number | Country | Date |
| --- | --- | --- |
| 508,359 | Great Britain | June 29, 1939 |